United States Patent
Buffone et al.

(10) Patent No.: US 8,657,561 B2
(45) Date of Patent: Feb. 25, 2014

(54) VARIABLE SHAPE ROTOR BLADE

(75) Inventors: Cosimo Buffone, Nottingham (GB); John R Webster, Derby (GB); Ian C D Care, Derby (GB)

(73) Assignee: Rolls-Royce PLC, London (GB)

( * ) Notice: Subject to any disclaimer, the term of this patent is extended or adjusted under 35 U.S.C. 154(b) by 655 days.

(21) Appl. No.: 12/887,120

(22) Filed: Sep. 21, 2010
(Under 37 CFR 1.47)

(65) Prior Publication Data
US 2011/0217170 A1 Sep. 8, 2011

(30) Foreign Application Priority Data

Sep. 24, 2009 (GB) .................................. 0916787.5

(51) Int. Cl.
*F01D 5/12* (2006.01)
(52) U.S. Cl.
USPC .................................... 415/12; 416/3; 416/23
(58) Field of Classification Search
USPC .......... 415/12, 48, 23; 416/3, 23, 39, 95, 240, 416/DIG. 5
See application file for complete search history.

(56) References Cited

U.S. PATENT DOCUMENTS

| | | | |
|---|---|---|---|
| 3,042,371 A | 7/1962 | Fanti | |
| 4,789,304 A | 12/1988 | Gustafson et al. | |
| 4,830,315 A * | 5/1989 | Presz et al. | 244/200 |
| 5,207,558 A * | 5/1993 | Hagle et al. | 415/161 |
| 5,314,301 A * | 5/1994 | Knight | 415/160 |
| 6,076,776 A | 6/2000 | Breitbach et al. | |
| 6,182,929 B1 | 2/2001 | Martin et al. | |
| 6,322,324 B1 * | 11/2001 | Kennedy et al. | 416/1 |
| 8,162,607 B2 * | 4/2012 | Grohmann et al. | 416/23 |
| 2005/0229585 A1 * | 10/2005 | Webster | 60/226.1 |
| 2006/0214065 A1 | 9/2006 | Jaenker | |
| 2007/0274823 A1 | 11/2007 | Borchers et al. | |
| 2008/0145204 A1 * | 6/2008 | Clark et al. | 415/48 |
| 2008/0253881 A1 * | 10/2008 | Richards | 415/145 |

FOREIGN PATENT DOCUMENTS

| | | |
|---|---|---|
| DE | 197 12 034 A1 | 9/1998 |
| DE | 198 59 041 C1 | 3/2000 |
| EP | 0 814 019 A2 | 12/1997 |
| EP | 0 905 019 A2 | 3/1999 |
| EP | 1 277 966 A2 | 1/2003 |
| EP | 1 338 793 A2 | 8/2003 |

(Continued)

OTHER PUBLICATIONS

Great Britain Search Report dated Jan. 21, 2010 in Great Britain Patent Application No. 0916787.5.

(Continued)

*Primary Examiner* — Edward Look
*Assistant Examiner* — William Grigos
(74) *Attorney, Agent, or Firm* — Oliff PLC

(57) ABSTRACT

A rotor blade comprising a core blade section; and a trailing edge section, the trailing edge section being attached to the core blade section along a join interface. The trailing edge section comprises a shape memory material which is actuable so as to cause selective deformation of the trailing edge section between a first condition in which a trailing edge of the trailing edge section follows a substantially smooth profile and a second condition in which the trailing edge is perturbed. The direction of the perturbation may be oblique or perpendicular to the direction of flow over the blade in use. The rotor blade may be a fan or propeller for a gas turbine engine.

17 Claims, 4 Drawing Sheets

(56) References Cited

FOREIGN PATENT DOCUMENTS

| EP | 1 612 416 A1 | 1/2006 |
| EP | 1 878 877 A2 | 1/2008 |
| JP | A-2003-227302 | 8/2003 |
| WO | WO 2004/069651 A1 | 8/2004 |
| WO | WO 2004/099608 A1 | 11/2004 |

OTHER PUBLICATIONS

Search Report issued in European Patent Application No. 10 17 3783 dated Apr. 15, 2013.

* cited by examiner

VARIABLE SHAPE ROTOR BLADE

The present invention relates to a rotor blade and more particularly to a rotor blade which can be selectively actuated so as to achieve a change in shape.

The present invention is applicable to blades of fans or propellers, such as those used on gas turbine engines (GTE's). However the principles of this invention may equally be applied to other types of machine where the aerodynamic profile of the blade has a significant impact on machine operation. Such machines may include, for example, other types of engines or electrical machines, wind turbines, industrial fans, compressors or the like. The invention is particularly of use where the machine has different modes or conditions of operation.

Increasing environmental concerns require that noise generated by rotor blades—in particular aircraft fans or propellers—is reduced. It has been proposed to provide a fan blade having a trailing edge which is profiled so as to reduce noise. European Patent 1,277,966 describes a fan blade having a serrated trailing edge to promote mixing of the wake from the blades in order to reduce noise.

Whilst such a solution does offer potential benefits, it should be acknowledged that noise is one of a number of issues to be considered in the design of rotor blades. There is pressure on GTE manufacturers in particular to produce ever increasing reductions to Specific Fuel Consumption (SFC). A serrated geometry for noise reduction will typically not be optimised for rotor fuel/operation efficiency. Accordingly a balance must be struck between a geometry which is ideal for noise reduction and a geometry which is optimised for efficiency.

The drive to reduce SFC has also lead to increased focus on open rotor GTE's, which may potentially offer increased efficiency compared to turbofan type GTE's. However where the nacelles surrounds the fan in turbofan engines and serves to dampen noise, the open propeller arrangement of open rotor engines are prone to increased noise problems since the propeller blades are exposed to a greater degree. The weight and size restraints on propeller blades also creates an additional problem, often requiring two rows of counter-rotating blades to be used instead of a single row of larger blades. The aerodynamic interaction between the counter-rotating blades can cause interaction tone noise which is a significant source of noise pollution.

The physical characteristics of profiled—for example, serrated—blades is a further problem which can impact on safety. In a bird strike scenario, large bending deformations may be experienced which, in turn, cause significant strain in the blade. In the case of a fibre-reinforced composite fan blade, the outer plies of the composite blade experience greater strains which can come close to the failure strain of the material. It has been proposed to reinforce the blade by bonding metal reinforcement to the most failure-prone blade regions. However the bond strength and reliability when bonding metal to composite creates its own problems and delamination can occur, notably in the region towards the trailing edge of the blade tip, such as by way of whiplash effect upon a bird strike.

It is an aim of the present invention to provide a novel rotor blade configuration which allows a balance to be achieved between noise and aerodynamic efficiency of a rotor.

It is a further aim to provide such a blade configuration which does not jeopardise the structural characteristics of the blade.

According to one aspect of the present invention there is provided a rotor blade comprising a core blade section and a trailing edge section, wherein the trailing edge section comprises an actuator which is actuable so as to cause selective deformation of the trailing edge section between a first condition in which a trailing edge of the trailing edge section follows a uniform profile and a second condition in which the trailing edge is perturbed.

The trailing edge in the first condition may display a substantially continuous curvature or else may undergo relatively gradual variation in curvature along its length. In contrast, in the perturbed condition the trailing edge may undergo a plurality of changes in orientation and/or magnitude of curvature.

In one embodiment, the trailing edge is perturbed in a direction which is oblique or perpendicular to the direction of flow over the blade in use. The trailing edge may be perturbed in a direction which is oblique or perpendicular to the mean or camber line of the blade, which blade may be an aerofoil. The blade may be perturbed in a manner which causes a plurality of perturbations along the length of the blade. The perturbations may be cyclic in arrangement, such that they follow a repeating pattern along the blade trailing edge.

The core and trailing edge sections may be attached along a join interface. The trailing edge section may comprise an attachment formation such as a protrusion or flange, which may be shaped to correspond to an attachment formation on the core blade section. The join interface may be formed between correspondingly shaped attachment formations of the trailing edge section and the core blade section.

Typically the trailing edge section and core blade section are elongate in form. The trailing edge section may comprise a plurality of discrete sections which are aligned to form the trailing edge section.

The rotor blade may further comprise fastening means to secure the trailing edge section to the core section at the join interface. The fastening means may be arranged along the join interface and/or across the interface. The fastening means may comprise a join member located between the respective attachment formations of the core section and the trailing edge section. The fastening means may comprise one or more fasteners and/or one or more adhesive materials.

In one embodiment, the trailing edge section comprises a shape memory material. One or more actuators may be arranged for effecting actuation of the shape memory material. The, or each, actuator may comprise a heating element arranged to selectively heat a region of the shape memory material in order to cause deformation between the first and second conditions. The shape memory material and/or heating element associated there-with may be considered to comprise an actuator.

According to a preferred embodiment, a plurality of actuators may be provided along the trailing edge section.

The shape memory material and/or actuators may be arranged to form a plurality of perturbations in the trailing edge profile along its length. The perturbations may be cyclic and/or alternating in direction. In one embodiment, the perturbations form a lobed trailing edge profile. In one embodiment, the perturbations form a slatted trailing edge.

In the second condition, a plurality of spaced portions of the trailing edge may be perturbed. In the second condition a plurality of spaced portions may remain unperturbed. Alternating perturbed and unperturbed portions may be spaced along the trailing edge. The actuators may be spaced along the trailing edge section so as to create the plurality of spaced perturbations in the trailing edge.

The first condition may constitute an at-rest condition and the second condition may constitute an actuated condition.

The shape memory material may comprise a shape memory metal and may be a shape memory alloy.

The trailing edge section may comprise a pair of opposing trailing edge members, which may be spaced so as to define an internal cavity there-between. The opposing trailing edge members may be spaced by one or more spacer members, which may be integrally formed with one of the trailing edge members or else attached thereto. One or more actuators may be located in the internal cavity and may be attached to a first of the trailing edge members. The first trailing edge member may comprise a shape memory material. The opposing trailing edge member may comprise a resiliently deformable metal material which is not an SMA. The opposing trailing edge members may meet at, or in the vicinity of, the trailing edge at an intersection. The intersection may allow relative slippage or other movement between the opposing trailing edge members upon movement between the first and second conditions of the trailing edge section.

According to a second aspect there is provided a gas turbine engine comprising a rotor blade according to the first aspect.

In one embodiment, the gas turbine engine may comprise an open rotor gas turbine engine. The rotor blade may be unducted and may constitute a propeller blade on such an engine. The gas turbine engine may have two rows of contra-rotating blades. The rotor blade of the first aspect may be located in a first, upstream, or second, downstream, row of blades.

According to a third aspect of the present invention, there is provided a rotor arrangement comprising first and second rotor blade arrays mounted for rotation about a common axis, the first blade array being arranged to rotate in an opposite direction to the second blade array, wherein the first blade array is positioned upstream of the second blade array and comprises a plurality of blades, each blade having a core blade section and a tail section, wherein the tail section comprises actuation means for causing selective deformation of the trailing edge section between a first condition in which a trailing edge of the trailing edge section follows a smooth profile and a second condition in which the trailing edge is perturbed.

Workable embodiments of the present invention are described in further detail below by way of example with reference to the accompanying drawings, of which:

Figure 1:
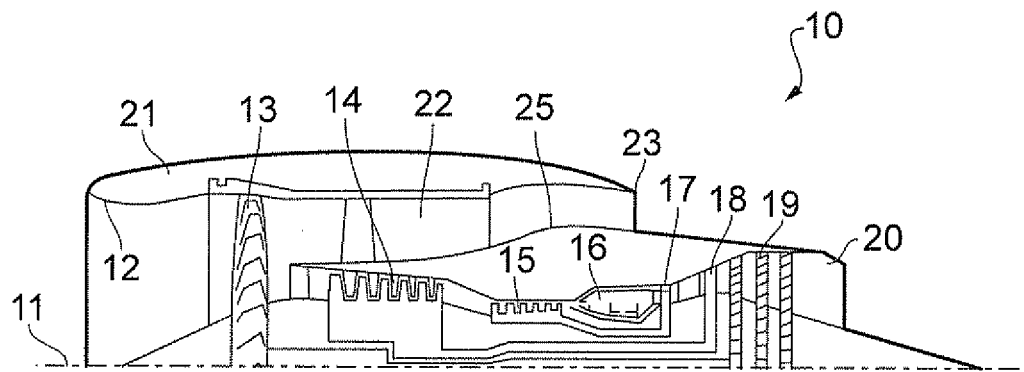
FIG. 1 shows a half longitudinal section of a turbofan type gas turbine engine (GTE) to which the present invention may be applied.

With reference to FIG. 1, a ducted fan GTE generally indicated at 10 has a principal and rotational axis 11. The engine 10 comprises, in axial flow series, an air intake 12, a propulsive fan 13, an intermediate pressure compressor 14, a high-pressure compressor 15, combustion equipment 16, a high-pressure turbine 17, and intermediate pressure turbine 18, a low-pressure turbine 19 and a core engine exhaust nozzle 20. A nacelle 21 generally surrounds the engine 10 and defines the intake 12, a bypass duct 22 and a bypass exhaust nozzle 23.

The GTE 10 works in a conventional manner so that air entering the intake 12 is accelerated by the fan 13 to produce two air flows: a first air flow into the intermediate pressure compressor 14 and a second air flow which passes through a bypass duct 22 to provide propulsive thrust. The intermediate pressure compressor 14 compresses the air flow directed into it before delivering that air to the high pressure compressor 15 where further compression takes place.

The compressed air exhausted from the high-pressure compressor 15 is directed into the combustion equipment 16 where it is mixed with fuel and the mixture combusted. The resultant hot combustion products then expand through, and thereby drive the high, intermediate and low-pressure turbines 17, 18, 19 before being exhausted through the nozzle 20 to provide additional propulsive thrust. The high, intermediate and low-pressure turbines 17, 18, 19 respectively drive the high and intermediate pressure compressors 15, 14 and the fan 13 by suitable interconnecting shafts.

Alternative GTE arrangements may comprise a two, as opposed to three, shaft arrangement and/or may provide for different bypass ratios or else no bypass.

Figure 2:
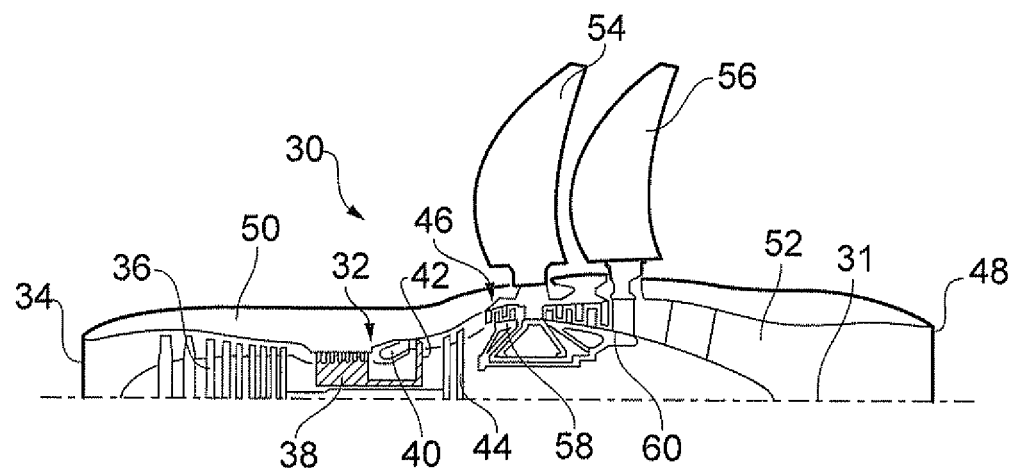
FIG. 2 shows a half longitudinal section of an open rotor GTE to which the present invention may be applied.

Other GTE configurations known to the skilled person include open rotor or un-ducted rotor designs, such as turbo-prop engines, in which the bypass duct is not present. Referring to FIG. 2, a twin-spooled, contra-rotating propeller GTE is generally indicated at 30 and has a principal and rotational axis 31. The GTE 30 comprises a core engine 32 having, in axial flow series, an air intake 34, an intermediate pressure compressor 36, a high-pressure compressor 38, combustion equipment 40, a high-pressure turbine 42, low pressure turbine 44, a free power turbine 46 and a core exhaust nozzle 48. A nacelle 50 generally surrounds the core engine 32 and defines the intake 34 and nozzle 48 and a core exhaust duct 52.

The engine 30 also comprises two contra-rotating propellers 54, 56 attached to and driven by the free power turbine 46, which comprises contra-rotating blade arrays 58, 60.

The GTE 30 works in a conventional manner so that air entering the intake 34 is accelerated and compressed by the compressor 36 and directed into the high pressure compressor 38 where further compression takes place. The compressed air exhausted from the compressor 38 is directed into the combustion equipment 40 where it is mixed with fuel and the mixture combusted. The resultant hot combustion products then expand through, and thereby drive the high, low-pressure and free power turbines 42, 44, 46 before being exhausted through the nozzle 48 to provide some propulsive thrust. The high, low-pressure and free power turbines 42, 44, 46 respectively drive the high and intermediate pressure compressors 38, 36 and the propellers 54, 56 by suitable interconnecting shafts. The propellers 54, 56 normally provide the majority of the propulsive thrust.

Embodiments of the present invention will now be described with reference to rotor blades which may constitute the blades of fan 13 in FIG. 1 or else propeller blades 54, 56 in FIG. 2.

Figure 3:
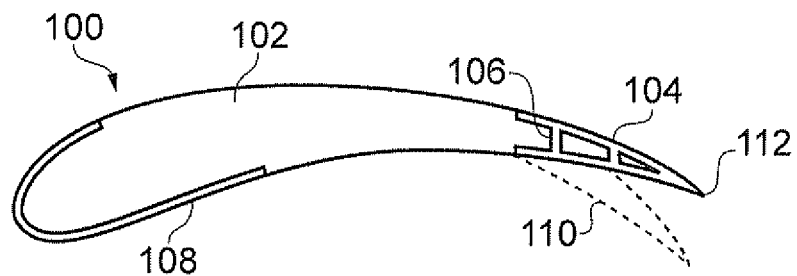
FIG. 3 shows a cross section through a blade according to the present invention.

Turning to FIG. 3, there is shown a sectional view of a general arrangement of a blade 100 according to the present invention, which is suitable for an open rotor arrangement. The blade 100 generally comprises a core blade section 102 and a trailing edge section 104 attached to the rearward or downstream end 106 of the core section 102. In this embodiment, the core section takes the form of a composite core blade arrangement, typically comprising a fibre reinforced resinous material such as a carbon fibre reinforced epoxy resin. A metallic—for example, titanium—leading edge section 108 may be provided about a leading edge of the composite core section 102. The leading and trailing edge sections are typically formed of a non-composite, metallic material.

A reinforced solid composite core structure of this type may provide weight advantages over solid titanium core blade structures. However the present invention is not specific to any one type of core blade construction and any known blade construction may be used for the core blade section 102 as long as it provides for a suitable attachment to the trailing edge section 104 as will be described below. Such constructions may include a hollow core blade structure formed of a plurality of layers or sheets of material, such as for example, titanium, having an internal cavity therein.

The trailing edge section 104 is actuable between an at-rest condition and an actuated condition 110, shown in phantom in FIG. 3. The deformation of the trailing edge section 104 in the actuated condition 110 is shown schematically and exaggerated for clarity. The trailing edge section 104 has a trailing edge 112 which in the at-rest condition follows a generally smooth profile such that the curvature thereof changes gradually over the length of the blade. In the perturbed condition 110, the trailing edge 112 is disturbed away from the at-rest condition and the sense and/or magnitude of curvature thereof varies a plurality of times over the length of the blade.

The at-rest condition generally represents a profile having greater aerodynamic efficiency than the actuated condition 110. The blade 102 in the at-rest condition may produce less drag than the blade in the actuated condition when rotating at operational speeds. The wake characteristics of the blade when the trailing edge is in the actuated condition 110 may differ from the characteristics in the at-rest condition in a manner which creates less aerodynamic noise due to the movement of the blade.

Figure 4C:
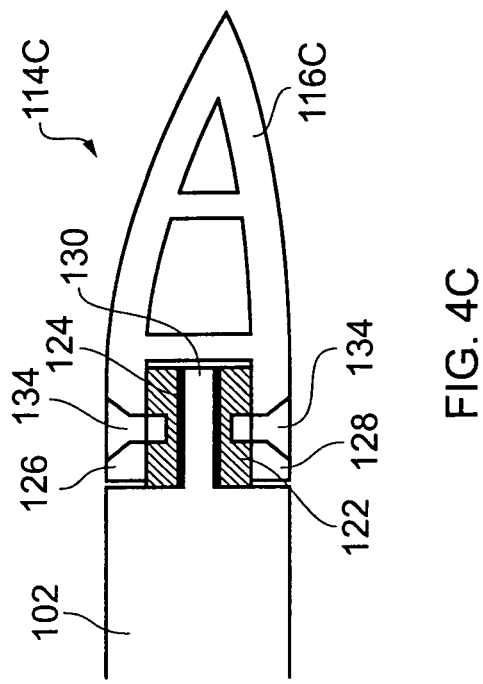
FIGS. 4A to 4C show embodiments of a trailing edge of a blade according to the present invention.
Figure 4A:
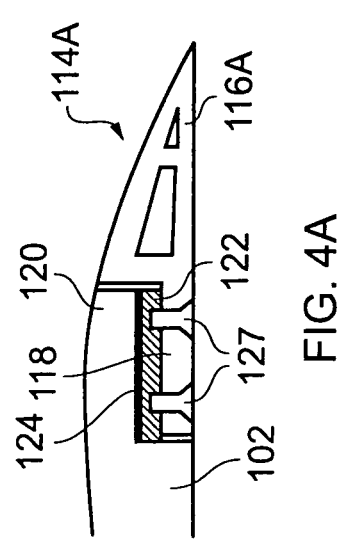
Figure 4B:
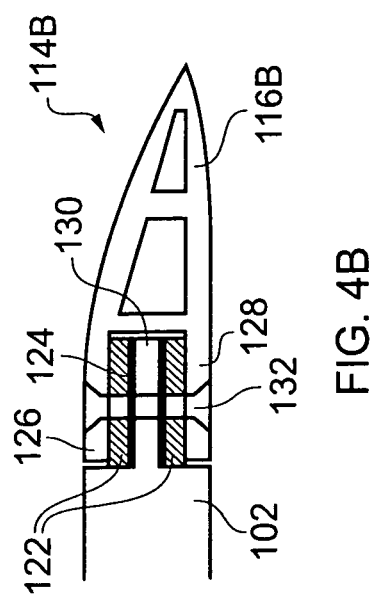

Turning now to FIG. 4 there are shown three different embodiments 114A, 114E and 114C of trailing edge section 104. In each of embodiments 114A, 114B and 114C, the trailing edge section comprises a body portion 116 consisting substantially of a memory material, such as a Shape Memory Alloy (SMA). FIGS. 4A-C show three different means for attachment of the trailing edge section body 116 to the core body 102 with the assistance of fasteners.

In FIG. 4A, the body 116A has a protrusion 118 and the core body 102 has an opposing protrusion 120. The protrusions 118 and 120 are arranged to overlap when core body 102 and trailing edge 114A sections are arranged for assembly. A join member 122 is inserted between protrusions 118 and 120 in a sandwich arrangement such that the protrusions 118 and 120 are spaced thereby. The join member 122 comprises a metallic member, typically formed of titanium, which is fixed to the core body protrusion 120 using an adhesive, such as a glue 124.

Fasteners 127 are used to attach the trailing edge protrusion 118 to the core body protrusion 120 via the titanium join member 122. In this embodiment the fasteners 127 take the form of a pair of screws or bolts arranged side-by-side, which pass through apertures in the protrusion 118 and into the titanium join member 122. The use of two or more spaced fasteners provides resistance to bending moments. The thickness of this metal join member 122 is based on minimum screw depth to ensure an adequate fastening is achieved.

Opposing protrusions 118 and 120 provide for a join interface there-between such that a number of joining techniques are available as will be understood by the skilled reader.

In FIGS. 4B and 4C, the trailing edge body portion 116B, 116C comprises a pair of spaced protrusions 126 and 128. The core body 102 comprises a protrusion 130 shaped and arranged to be inserted between the opposing spaced protrusions 126 and 128. A join member 122 is located against the opposing sides of protrusion 130 in abutment with each of the protrusions 126 and 128. Thus an insert member is located between the protrusion 130 and each of protrusions 126 and 128 as shown in FIGS. 4B and 4C. Each of the plurality of join members is fixed to the core body protrusion 130 using an adhesive such as a glue 124.

As shown in FIG. 4B, a fastener 132 may pas through the protrusions 126, 128, 130 and the corresponding join members 122. Such a fastener may take the form of a screw or bolt.

In FIG. 4C, the single fastener 132 of FIG. 4B has been replaced by a pair of opposing fasteners 134 which depend inwardly from the outer surface of protrusions 126 and 128 respectively. Each fastener 134 terminates in the respective join member 122.

In any embodiment, the fasteners 127, 132 or 134 may be countersunk so as to avoid significant detriment to the aerodynamic profile of the trailing edge section. The head of such a fattener may lie flush with a gas washed surface of the blade or covered with a filler or protective barrier material, such as an epoxy or polyeurathane layer.

In other embodiments, the trailing edge section may be additionally or alternatively attached to the core body 102 using other conventional joining techniques, such as those for bonding titanium leading and trailing edge portions to a composite fan blade. Techniques such as rivets, brazing or welding may be used dependent on the material selection and operating conditions of the blade. The attachment of the Ti-SMA trailing edge to the blade composite core may also be achieved by adhesive thus avoiding the need to provide holes in the composite to fix the two parts together.

Turning now to FIG. 5, there are shown a plurality of alternative arrangements for the structure of the trailing edge section. All the embodiments of FIG. 5 are shown as having an attachment structure according to the arrangement of FIG. 4A but may be modified to accommodate the attachment structure of FIG. 4B or 4C as required.

Figure 5A:
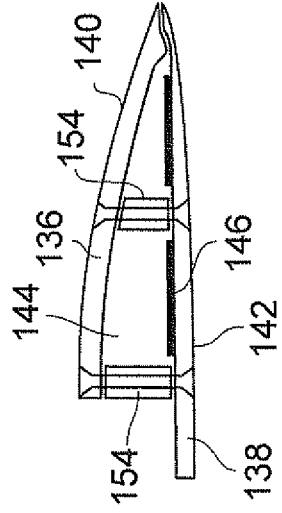
FIGS. 5A to 5C show further embodiments of a trailing edge of a blade according to the present invention.
Figure 5B:
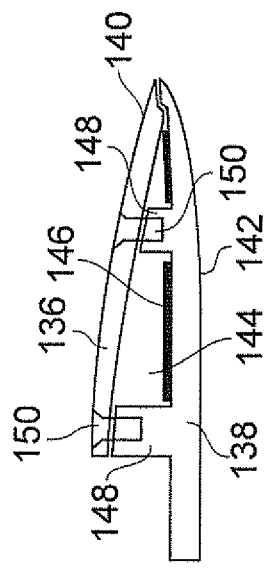
Figure 5C:
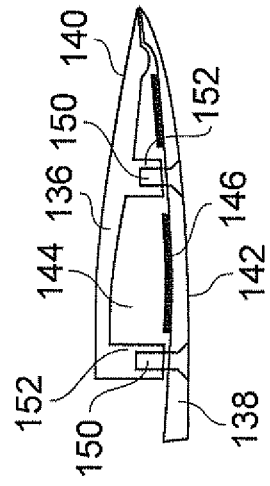

In FIGS. 5A to 5C, the trailing edge section 104 comprises opposing first 136 and second 138 members. The first member 136 has an outer gas washed surface 140 representing an upper airfoil surface with respect to the direction of gas flow in use. The second member 138 has an outer gas washed surface 142 representing a lower airfoil surface with respect to the direction of gas flow in use.

In the embodiments of FIG. 4, the first member 136 is formed of a resiliently deformable material in the form of a metal, such as for example, titanium. The second member 138 is formed of a shape memory material such as a SMA material.

The opposing first and second members are shaped so as to provide an internal void or cavity 144 within the blade trailing edge section 104. Within the internal cavity 144 there is located an actuator in the form of a heater 146 having one or more heating elements.

The different embodiments of FIGS. 5A to 5C propose different techniques for accommodating the spaced arrangement of the first and second members. In FIG. 5A, spacer formations in the form of pedestals 148 of predetermined height are integrally formed with the second member, for example by machining of the second member. The pedestals 148 are attached to the first member 136 using fasteners 150, such as, for example, countersunk screws 150. Fasteners or brazing may be used in preference to welding since the welding temperature may potentially interfere with the memory effect of the SMA.

In FIG. 5B, the pedestals 152 are integrally formed with the first member 136 and are attached to the second member 140 using fasteners 150. In FIG. 5C, the pedestals are discrete members 154, attached between the first and second members using suitable fasteners, which, in this example are depicted as opposing screw fasteners. The discrete spacer members 154 of this embodiment have through holes therein. In any embodiment, the pedestals and/or first and second members may have one or more bores formed therein to accommodate the fasteners, which may be threaded.

Whilst the use of other joining methods may be used in place of the releasable fasteners described above, a releasable fastening means is in may ways preferred since it will allow subsequent access to the actuator 146 for inspection and/or replacement thereof in case of premature failure of a heating element.

The heater is fixed to an internal surface of the second (SMA) member 138 using an adhesive. Suitable bonding materials are known in the art from use of heater mats for other related applications, such as for example de-icing of gas turbine engines or aircraft wings, and can be usefully employed here. The heating elements may also be sprayed onto the inside of the SMA trailing edge member 138. The close spacing of the first and second members may also serve to retain the heater elements in the desired location within the trailing edge section. The heater elements may be constrained by the shape of the internal space within the trailing edge section.

It can be seen in FIGS. 5A to 5C that a plurality of pedestals formations are present which define a plurality of internal cavities between the opposing trailing edge members. A plurality of spaced actuators may be provided in this regard at different spacings from the trailing edge. The plurality of heaters may be controlled independently to accommodate a desirous heating profile for actuation of the trailing edge section as will be described below.

Figure 6A:
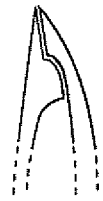
FIGS. 6A and 6B show alternative trailing edge features of the embodiments 5A to 5C.
Figure 6B:

With reference to FIG. 6, two different embodiments of the interface between the first 136 and second 138 members are shown. In each embodiment, the first and second members are shaped at the interface to provide for overlap between the first and second members. The degree of overlap allows relative movement between the first and second members in the vicinity of the trailing edge so as to help attenuate internal stress with the trailing edge section caused by relative movement between the first and second members upon actuation. The tip is an area of concern for possible stress concentration and so a sliding contact between the opposing members is permitted in this region. In FIG. 6A, the interface is provided a short distance upstream of the trailing edge in the upper airfoil surface 140. In FIG. 6B, the interface is provided at the trailing edge itself. In either embodiment, the first and second members may be shaped in the vicinity of the interface to ensure close contact between aid members. In the embodiments shown, the first and second members are shaped to provide an abutment which permits relative movement in one direction but resists movement in the opposite direction.

Figure 7A:
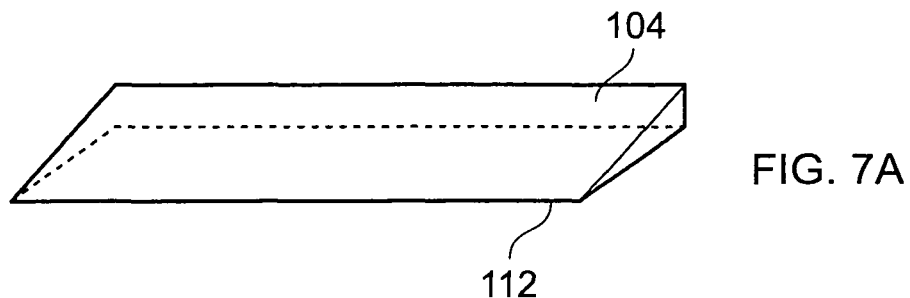
FIG. 7 shows a three dimensional view of a portion of an actuated trailing edge of a blade according to one embodiment of the present invention; and, FIGS. 8A and 8B show respective plan and end views of a trailing edge of a blade according to a further embodiment of the present invention.
Figure 7B:
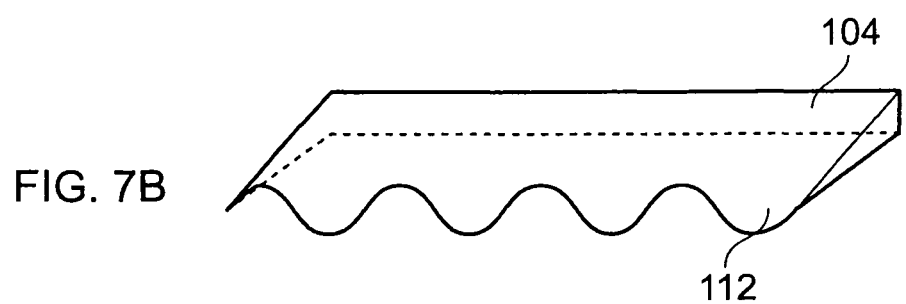

Turning now to FIG. 7, there is shown the trailing edge section 104 in an at rest condition (FIG. 7A) and in an actuated condition (FIG. 7B). In FIG. 7A, the heating elements 146 are not active and thus the trailing edge section 104 is retained at the temperature of the surrounding environment. The trailing edge 112 is aligned along its length. In FIG. 7B, the heating elements are activated causing deformation or morphing of the trailing edge section to create a perturbed, lobed trailing edge 112. The aerodynamic design of the blades are such that should a heater or its actuator fail, the at rest position of the blade will not prevent the safe running of the engine. In such circumstance the blade will simply function as a conventional blade without the additional noise reduction or fuel burn improvement proposed by the invention.

The SMA is formed of a conventional memory material. In this embodiment a nickel-titanium (NiTi) alloy is used which changes from a martensitic to an austenitic state upon heating. Thus the SMA is formed such that in the austenitic state the SMA has the desired shape to produce the perturbed condition of the trailing edge 112. The SMA is cooled to a martensitic state which conforms to the at-rest condition of the trailing edge section but which retains the memory of the perturbed condition. Thus upon heating of the SMA by the heating elements 146 to above a temperature at which the transition to the austenitic state occurs, internal strain is generated within the SMA and communicated to the opposing member 136 in order to actuate the trailing edge section.

Actuators 146 may be spaced at a plurality of locations along the length of the trailing edge section in order to achieve the desired perturbed shape. The regions of greatest deformation will typically occur at the location of the actuators.

The actuation of the trailing edge section 104 is reversible by discontinuing the heating of the SMA material. As the SMA material cools, it will return to the at rest condition, thus forcing the remaining non-SMA portion of the trailing edge section to its original position as shown in FIG. 7A. Accordingly repeated heating and cooling of the shape memory material is possible dependent on the operational requirements of the blade. The SMA actuation is preferably designed to put less than 1.5% strain into the SMA material to ensure its life is at least that of the rest of the blade structure.

This allows actuation of the blades in an aircraft engine fan or propeller blade array so as to reduce noise, for example during take-off and landing. When an aircraft is at cruise or else at sufficient altitude, the blade trailing edge section can be returned to the at-rest condition to avoid the aerodynamic penalties associated therewith. This may overcome a significant problem with the fixed trailing edge profiles of the prior art that the increased mixing of air inside the wake is important to reduce community noise but very detrimental over the rest of the flight profile due to increased aerodynamics losses. Furthermore, in contrast to a serrated trailing edge profile, the trailing edge of the present invention avoids reduction in the effective blade surface area, offering increased aerodynamic efficiency over the prior art even when in the actuated condition.

Figure 8A:
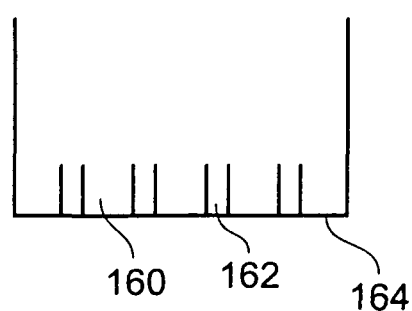
Figure 8B:
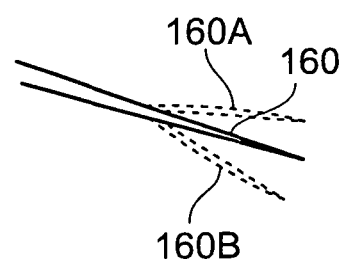

In a further embodiment of the present invention as shown in FIGS. 8A and 8B, the perturbation of the trailing edge is achieved by way of slats 160. The slats each comprise a memory material such as an SMA as described above. However each slat is spaced by a portion 162 of the trailing edge section in which no SMA is present. A sequence of alternating slat sections 160 and rigid spacer sections 162 is arranged along the length of the blade trailing edge 164. The spacer sections 162 may be of a structure which mimics that of a conventional blade cross section, whereas the slats may have a cross section as shown in any one of FIG. 4 or 5.

In this embodiment adjacent slats are arranged to be actuable in opposing directions as depicted in FIG. 8B, such that one slat 160A moves in a first direction upon actuation and an adjacent slat 160E moves in an opposing direction. This is achieved (with reference to FIG. 5) by alternating the relative positions of the first member 136 and the opposing SMA member 138 within the slat portions 160 along the length of the blade. On the inward moving slats the SMA member 142 is below the opposing titanium member 136. For the outward moving slats the SMA member 142 is arranged above the opposing titanium member 136.

A variation of this embodiment may be used for wind turbine blades to disturb the boundary layer during high winds so as to reduce blade efficiency and keep the rotational speed within safe limits and still producing power. This may extend the useful operating envelope of the wind turbine, beyond which the rotation is locked or braked.

In an alternative embodiment, this may be achieved by using SMA members 142 having the same shape in their martensitic state but different shape in their austenitic state.

During take-off the SMA will be heated and some slats 160B will move inwards and some others 160A will move outwards as shown in FIG. 8B. After take-off the heating elements which induced the Shape Memory Alloy to deform will be switched off and the SMA will regain their original shape, returning the trailing edge to a straight profile. The rigid spacer sections 162 resist deformation of the trailing edge in the actuated condition and help to ensure that the at-rest position is restored upon cooling of the SMA members. The spacer sections 162 may also serve to avoid flutter of the trailing edge. This is because the SMA in its martensitic state typically exhibits a lower Young modulus and therefore offers reduced resilience. Accordingly the rigid spacer sections 162 serve to support the slat sections 160 and resist airflow loading.

The attachment of the Ti-SMA trailing edge slats to the to an open rotor composite blade or else a fan blade can be achieved by adhesive if it is necessary to avoid machining holes in the composite to fix the sections together.

The above described embodiments provide for a trailing edge section in which the shape memory material is either provided as a continuous strip along the length of the blade or else as a plurality of spaced shape memory sections 160. Any other features described in relation to any one particular embodiment are to be considered to be applicable to any other embodiment wherever practicable.

The sizes of the slats or lobes formed upon actuation of the trailing edge section will depend on the size and profile of the airfoil as well as the range of angle of attack of the blade. The profile of the actuated trailing edge will typically display changes in trailing edge curvature or orientation in a cyclic fashion which repeats a plurality of times along the length of the blade.

The invention claimed is:

1. A rotor blade comprising:
a core blade section; and
a trailing edge section, the trailing edge section being attached to the core blade section along a join interface, wherein the trailing edge section comprises a shape memory material which is actuable so as to cause selective deformation of the trailing edge section between a first condition in which a trailing edge of the trailing edge section follows a substantially smooth profile and a second condition in which the trailing edge is perturbed such that the profile of the trailing edge varies a plurality of times over the length of the blade.

2. A rotor blade according to claim 1, wherein the direction of the perturbation from the first condition is oblique or perpendicular to a direction of flow over the blade in use.

3. A rotor blade according to claim 1, wherein the core blade section and the trailing edge section comprise correspondingly shaped attachment formations such, join interface being formed there-between, the blade further comprising fastening means securing the trailing edge section to the core section at the join interface.

4. A rotor blade according to claim 1, wherein the trailing edge section comprises one or more actuators for effecting actuation of the shape memory material into the second condition.

5. A rotor blade according to claim 4, wherein the, or each, actuator comprises a heating element arranged to selectively heat a region of the shape memory material in order to cause deformation between the first and second conditions.

6. A rotor blade according to claim 4, wherein a plurality of actuators are spaced along the length of the trailing edge section.

7. A rotor blade according to claim 4, wherein the shape memory material and/or actuators are arranged to form a plurality of perturbations along the length of the trailing edge in the second condition.

8. A rotor blade according to claim 7, wherein the perturbations are cyclic.

9. A rotor blade according to claim 7, wherein the perturbations are lobed or slatted in shape.

10. A rotor blade according to claim 1, wherein the trailing edge section comprises first and second opposing portions, the first portion comprising a shape memory material and the second portion comprising a non shape memory material.

11. A rotor blade according to claim 10, wherein the opposing first and second portions comprise respective first and second members, each of the first and second members having an outer surface which forms a fluid washed surface of the blade and the first and second members being arranged to form an internal space there-between in which one or more actuators is located for causing the selective deformation of the trailing edge section.

12. A rotor blade according to claim 10, wherein the first and second portions meet in the vicinity of the trailing edge in a manner which allows relative movement there-between.

13. A rotor blade according to claim 1, wherein the first condition is an at rest condition and the second condition is an actuated condition.

14. A rotor blade according to claim 1, wherein the memory material is a shape memory alloy.

15. A rotor blade according to claim 1, wherein the core blade section is formed of a composite material.

16. A gas turbine engine having a rotor blade according to claim 1.

17. A rotor arrangement comprising: first and second rotor blade arrays mounted for rotation about a common axis, the first blade array being arranged to rotate in an opposite direction to the second blade array, wherein the first blade array is positioned upstream of the second blade array and comprises a plurality of blades, each blade having a core blade section and a tail section, wherein the tail section comprises actuation means for causing selective deformation of the trailing edge section between a first condition in which a trailing edge of the trailing edge section follows a smooth profile and a second condition in which the trailing edge is perturbed such that the profile of the trailing edge varies a plurality of times over the length of the blade.

* * * * *